United States Patent [19]

Mahr

[11] Patent Number: 4,554,205

[45] Date of Patent: Nov. 19, 1985

[54] LAMINATED SAILCLOTH

[76] Inventor: Peter Mahr, 32 Fleming La., Fairfield, Conn. 06430

[21] Appl. No.: 709,222

[22] Filed: Mar. 7, 1985

[51] Int. Cl.$^4$ .............................................. B32B 7/00
[52] U.S. Cl. .................................. 428/253; 428/246; 428/247; 428/252
[58] Field of Search ................ 428/246, 247, 253, 252

[56] References Cited

U.S. PATENT DOCUMENTS

| | | | |
|---|---|---|---|
| 2,973,293 | 2/1961 | Schofield | 428/246 |
| 3,497,415 | 2/1970 | Adachi | 428/253 |
| 3,779,857 | 12/1973 | Hadgraft et al. | 428/246 |
| 4,122,227 | 10/1978 | Dean | 468/246 |
| 4,444,822 | 4/1984 | Doyle | 428/253 |

Primary Examiner—James J. Bell
Attorney, Agent, or Firm—Gary, Juettner & Pyle

[57] ABSTRACT

An improved sailcloth is composed of a laminate of two fabrics, are being tightly woven, light weight, highly resinated cloth, and the other being a loosely woven or knit fabric.

7 Claims, No Drawings

LAMINATED SAILCLOTH

BACKGROUND OF THE INVENTION

This invention relates to the fabrication of cloths used to make sails for boats or other vessels and more particularly to a novel laminated cloth having dissimilar plies, wherein the properties of the laminate as a sail material are superior to those of the individual plies or to a conventional cloth of the same basis weight.

In the art of sailmaking, recent advances have resulted in the use of materials and sail designs which offer optimum performance. One desirable criteria in sails is to provide a cloth which is dimensionally stable or has a predictable stretch. This criteria has been met in several different ways, including the use of particular weaves in the cloth and by providing a particular orientation of the yarns of cloth in the layout of the sail. More recently, sails have been constructed in which woven cloth is laminated to a sheet of continuous film, although the use of film laminates is not allowed in some competitive sailing classes.

SUMMARY OF THE INVENTION

In accordance with the present invention, a novel sailcloth is provided by laminating a ply of tightly woven cloth to a ply of loosely woven or knit cloth as defined herein. The two plies serve to contribute particular desirable properties to the composite fabric, whereas the individual plies would not normally be considered useful in the manufacture of sails. The laminate has better strength properties than a single ply sailcloth of comparable weight.

DESCRIPTION OF THE PREFERRED EMBODIMENT

As will be described herein in more detail, the sailcloth of the present invention comprises a laminate made up from two dissimilar plies of flexible fabrics or cloths. The two fabrics are prepared separately and are then laminated together using a suitable curable flexible adhesive, of which many are conventionally available. The composite or laminate may be cut into panels which are jointed edgewise such as by sewing or other bonding to make a sail.

The laminate of the present invention comprises a firmly finished sailcloth having a tight weave, and a knit or woven material having a loose weave. Both plies may be prepared by conventional weaving or knitting operations and may be composed of conventional polyester yarns. In a woven material, fill or weft yarns are passed over and under successive warp yarns to produce a cloth-like fabric.

In general, the use of a tightly woven, firmly finished (or highly resinated) cloth, as herein defined, would not alone be practical as a sailcloth because of low resistance to tear. The use of a loose weave or knit fabric alone also would not be practical because the material would not offer sufficient resistance to stretch on the bias, i.e., on an angle relative to the warp and weft yarns. This weakness could not be avoided by the application of a resin to the loose weave due to the excessive spacing of yarns in the cloth.

The tightness of a weave is measured by a complex number referred to as the "cover factor." For the purposes of the present invention, a more simple term referred to as "relative cover factor" will be employed.

The relative cover factor is proportional to the tightness of the weave and is defined herein as:

Relative Cover Factor (RCF) = $C\sqrt{D}$ wherein
C is the thread or yarn count in the warp or weft direction; and D is the yarn size in the warp or weft direction in denier (grams per 9000 meters of yarn)

In general, the higher the relative cover factor, the tighter the weave. A typical sailcloth, for example, would be a 6.7 oz. woven material having 220×350 denier (warp x fill) and 125×70 threads per inch (warp-×fill). In accordance with the above formula, the material would have 1854 RCF for the warp and 1310 RCF for the weft or fill.

In accordance with the present invention, the tightly woven ply of the laminate has a minimum RCF in the fill for the following RCF values in the warp:

| Warp | Fill |
|---|---|
| 800 to 1000 | >1000 |
| 1000 to 1500 | >900 |
| >1500 | >800 |

Summarizing the foregoing, the combined RCF for warp and weft will generally be greater than about 1800 to 1900 to achieve the desired degree of tightness of weave.

In addition to the required minimum values for the relative cover factor, the tightly woven ply of the laminate will be treated with a coating or impregnation of a curable resin, such as a melamine formaldehyde based emulsion. After impregnation, the resin is cured by heat and pressure, such as by passing the treated cloth between heated rolls. The resin tends to fill the fine pores in the cloth, such that the tightly woven cloth exhibits properties similar to that of a film in terms of diagonal stretch resistance. Also, since the treated cloth is to be used in a laminate, a lighter weight material is preferred. Generally, the preferred maximum weight will be less than 4 oz. per sailmaker's square yard (28.5 in.×36 in.).

The second or loosely woven ply is constructed from woven or knitted yarns by conventional methods, although the weave is much looser than would be used in a conventional sailcloth. For the purposes of the present invention, this second ply has a relative cover value of less than 1000 in the warp direction and less than 700 in the fill direction, for a combined value of less than 1700.

As mentioned previously, the resinated, tightly woven material is laminated directly to the loosely woven fabric with the respective yarns of the materials in parallel using a suitable adhesive. It is not necessary to resinate the loosely woven fabric, although this may be done as an optional measure. If desired, the laminated material may be subjected to conventional finishing operations such as heating and calendering.

In the laminated sailcloth of the present invention, the desirable properties of each of the plies tend to complement or overcome the undesirable properties of the other. The tightly woven resinated cloth, well having poor tear resistance, enhances the diagonal stretch resistance of the laminate. The loosely woven ply, while having poor diagonal stretch resistance, enhances the overall tear resistance of the laminate and also increases the strength of the laminate in the directions of the yarns.

The sailcloth of the present invention is stronger than conventional woven cloth of comparable weight. For example, samples of laminate and conventional resinated sailcloth were tested under identical conditions to measure strength in the warp direction at 25 units (1.56%) stretch. The weight of the cloth is expressed in terms of total weight, including any resin and adhesive, for identical units of area (28.5 in. × 36 in.). The laminate was composed of a ply of 2.4 oz. tightly woven cloth, a ply of 1.2 oz. loosely woven cloth, and 0.4 oz. adhesive.

|  | Laminate | Conventional (single ply) |
|---|---|---|
| Weight | 4.0 oz. | 4.35 oz. |
| Strength | 45.5 lb./in. | 32 lb./in. |

I claim:

1. An improved sailcloth comprising first and second fabric plies laminated together with an adhesive, said first ply being a tightly woven, resinated cloth having a combined relative cover factor in the warp and weft directions of at least 1800, said second fabric ply having a relative cover factor of less than 1000 in the warp direction and less than 700 in the weft direction.

2. The improved sailcloth of claim 1 wherein said second fabric ply is a loose weave.

3. The improved sailcloth of claim 1 wherein said second fabric ply is a loose knit.

4. The improved sailcloth of claim 1 wherein the first fabric has a relative cover factor in the warp and weft direction as follows:

| Warp | Fill |
|---|---|
| 800 to 100 | >1000 |
| 1000 to 1500 | >900 |
| >1500 | >800. |

5. The improved sailcloth of claim 4 wherein said first fabric has a weight of less than 4 oz. per sailmaker's square yard.

6. The improved sailcloth of claim 1 wherein said first and second fabric plies are both woven from yarns and are laminated together with their yarns in parallel for improved strength and stretch resistance.

7. The improved sailcloth of claim 6 wherein the laminated cloth has a greater strength in the direction of the yarns than a single ply cloth of the same weight.

* * * * *